United States Patent
Bell

(10) Patent No.: US 7,170,492 B2
(45) Date of Patent: Jan. 30, 2007

(54) INTERACTIVE VIDEO DISPLAY SYSTEM

(75) Inventor: Matthew Bell, Palo Alto, CA (US)

(73) Assignee: Reactrix Systems, Inc., Redwood City, CA (US)

( * ) Notice: Subject to any disclaimer, the term of this patent is extended or adjusted under 35 U.S.C. 154(b) by 0 days.

(21) Appl. No.: 11/083,851

(22) Filed: Mar. 18, 2005

(65) Prior Publication Data

US 2006/0132432 A1 Jun. 22, 2006

Related U.S. Application Data

(63) Continuation-in-part of application No. 10/160,217, filed on May 28, 2002, and a continuation-in-part of application No. 10/946,263, filed on Sep. 20, 2004, and a continuation-in-part of application No. 10/946,084, filed on Sep. 20, 2004, and a continuation-in-part of application No. 10/946,414, filed on Sep. 20, 2004.

(60) Provisional application No. 60/554,520, filed on Mar. 18, 2004.

(51) Int. Cl.
*G09G 5/00* (2006.01)
*G09G 5/08* (2006.01)
(52) U.S. Cl. .................. 345/158; 345/156; 345/157
(58) Field of Classification Search ........ 345/156–168, 345/418–428; 463/30–37
See application file for complete search history.

(56) References Cited

U.S. PATENT DOCUMENTS

| 5,325,472 | A | * | 6/1994 | Horiuchi et al. ............. 345/427 |
| 6,084,979 | A | * | 7/2000 | Kanade et al. .............. 382/154 |
| 6,097,369 | A | * | 8/2000 | Wambach .................... 345/158 |
| 6,198,487 | B1 | * | 3/2001 | Fortenbery et al. ......... 345/420 |
| 2001/0012001 | A1 | | 8/2001 | Junichi et al. |
| 2002/0041327 | A1 | | 4/2002 | Hildreth et al. ............... 348/42 |
| 2002/0064382 | A1 | | 5/2002 | Hildreth et al. ............. 396/100 |
| 2002/0103617 | A1 | * | 8/2002 | Uchiyama et al. .......... 702/150 |
| 2004/0046736 | A1 | | 3/2004 | Pryor et al. |
| 2004/0046744 | A1 | | 3/2004 | Abbas et al. |

FOREIGN PATENT DOCUMENTS

| EP | 0 913 790 A | 5/1999 |
| WO | WO 2004/055776 A | 7/2004 |

\* cited by examiner

*Primary Examiner*—Vijay Shankar

(57) ABSTRACT

An interactive video display system. A display screen is for displaying a visual image for presentation to a user. A camera is for detecting an object in an interactive area located in front of the display screen, the camera operable to capture three-dimensional information about the object. A computer system is for directing the display screen to change the visual image in response to the object.

28 Claims, 7 Drawing Sheets

INTERACTIVE VIDEO DISPLAY SYSTEM

CROSS-REFERENCE TO RELATED APPLICATION

This application is a Continuation-in-Part Patent Application claiming priority from co-pending U.S. patent application Ser. No. 10/160,217, filed on May 28, 2002, entitled "INTERACTIVE VIDEO DISPLAY SYSTEM," by Bell, and assigned to the assignee of the present application, co-pending U.S. patent application Ser. No. 10/946,263, filed on Sep. 20, 2004, entitled "SELF-CONTAINED INTERACTIVE VIDEO DISPLAY SYSTEM," by Bell et al., and assigned to the assignee of the present application, co-pending U.S. patent application Ser. No. 10/946,084, filed on Sep. 20, 2004, entitled "SELF-CONTAINED INTERACTIVE VIDEO DISPLAY SYSTEM," by Bell, and assigned to the assignee of the present application, and co-pending U.S. patent application Ser. No. 10/946,414, filed on Sep. 20, 2004, entitled "INTERACTIVE VIDEO WINDOW DISPLAY SYSTEM," by Bell, and assigned to the assignee of the present application, all of which are herein incorporated by reference. This application also claims priority from co-pending U.S. Provisional Patent Application No. 60/554,520, filed on Mar. 18, 2004, entitled "METHOD AND SYSTEM FOR ALLOWING A CAMERA TO VIEW AN AREA IN FRONT OF A DISPLAY BY IMAGING IT THROUGH THE DISPLAY," by Bell et al., and assigned to the assignee of the present application, all of which are herein incorporated by reference.

FIELD OF INVENTION

The present invention relates to the field of visual electronic displays. Specifically, embodiments of the present invention relate to an interactive video display system.

BACKGROUND OF THE INVENTION

For many years, information was typically conveyed to an audience by use of static displays. For example, product advertisements were presented using print ads and posters. With the advent of television and movies, information could be presented using a dynamic display (e.g., commercials). While more engaging than static displays, dynamic displays do not typically provide interactivity between a user and the display.

More recently, interactive touchscreens have been used for presenting information on flat surfaces. For example, an image may be displayed on a touchscreen, and a user may interact with the image by touching the touchscreen, causing the image to change. However, in order to interact with the image displayed on the touchscreen, the user must actually come in contact with the touchscreen. Moreover, typically touchscreens can only receive one input at any time, and are not able to discern the shape of the input. Essentially, current touchscreens are only able to receive the input of one finger contact.

In some applications, such as point-of-sale, retail advertising, promotions, arcade entertainment sites, etc., it is desirable to provide an interactive interface for displaying information to a user. This interactivity provides an even more engaging interface for presenting information (e.g., media, advertisements, etc.). By catching the attention of a person, for even a few moments, the person may be more likely to absorb the information presented in the interactive display than in previous displays.

As described above, current interactive displays typically require a user to physically contact a touchscreen surface. By requiring contact with a touchscreen to provide interactivity, a large number of potential users are not interested in or intimidated by current interactive displays. Moreover, since only one user may interact with a touchscreen at a time, more users are excluded. Furthermore, because current touchscreens cannot discern the shape of input, they are limited in the type of information that can be presented in response to interaction.

SUMMARY OF THE INVENTION

Various embodiments of the present invention, an interactive video display system, are described herein. In one embodiment, the present invention provides a self-contained interactive video display system. A display screen is for displaying a visual image for presentation to a user. In one embodiment, the display screen is a cathode ray tube (CRT). In another embodiment, the display screen is a flat-panel display screen. In one embodiment, the flat-panel display screen is a liquid crystal display (LCD) screen. In another embodiment, the display screen is a plasma screen. In one embodiment, the self-contained interactive video display system further includes a projector for projecting the visual image and wherein the display screen is a screen for displaying the visual image.

A camera is for detecting an object in an interactive area located in front of the display screen, where the camera is operable to capture three-dimensional information about the object. In one embodiment, the camera is a time-of-flight camera. In one embodiment, the object is a user. In one embodiment, the distance information is used for person tracking. In one embodiment, the distance information is used for feature tracking.

In one embodiment, the self-contained interactive video display system further includes a second camera for detecting the object. In one embodiment, the second camera is a time-of-flight camera. In one embodiment, the camera and the second camera operate in conjunction to create the interactive area. In another embodiment, the camera is operable to create the interactive area proximate the display screen, and the second camera is operable to create a second interactive area farther from the display screen than the interactive area.

In one embodiment, the self-contained interactive video display system further includes an infrared camera for creating a second interactive area. In one embodiment, the camera provides the computer system with three-dimensional information at a first frame rate and the infrared camera provides the computer system with two-dimensional information at a second frame rate, wherein the first frame rate is slower than the second frame rate, such that the computer system is operable to generate high quality three-dimensional information based on the three-dimensional information and the two-dimensional information. In one embodiment, the computer system can identify a portion of people near the self-contained interactive video display system actively interact with the self-contained interactive video display system by determining people in the second interactive area that do not enter the interactive area.

In one embodiment, the interactive area comprises a plurality of interactive regions including volumetric regions at particular distances from the display screen. In one embodiment, a first volumetric region extends from the display screen to a particular distance from the display screen, and a second volumetric region extends from the particular distance away from the display screen. In one embodiment, the second volumetric region extends to a second particular distance away from the display screen. In one embodiment, the second particular distance is dynamic. In one embodiment, a user may interact with the visual image by moving into and out of the first volumetric region.

In another embodiment, the present invention provides an interactive video display system. A display screen is for displaying a visual image for presentation to a user. A camera is for detecting an object in an interactive area located in front of the display screen, the camera operable to capture three-dimensional information about the object. In one embodiment, the camera is a time-of-flight camera. A computer system is for directing the display screen to change the visual image in response to the object. In one embodiment, the camera is separate from the display screen, such that the interactive area is between the camera and the display screen. In one embodiment, the interactive video display system includes a second camera for detecting the object, wherein the second camera is separate from the display screen. In one embodiment, the second camera is a time-of-flight camera. In one embodiment, the camera and the second camera operate in conjunction to create the interactive area. In another embodiment, the camera is operable to create the interactive area proximate the display screen, and the second camera is operable to create a second interactive area farther from the display screen than the interactive area.

In another embodiment, the present invention provides a method for presenting an interactive visual image using an interactive video display system. A visual image is displayed on a display screen, wherein the visual image is for presentation to a user on a front side of the display screen. Interaction of an object with the visual image is detected using a camera, the camera operable to capture three-dimensional information about the object. The visual image is changed in response to the interaction.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
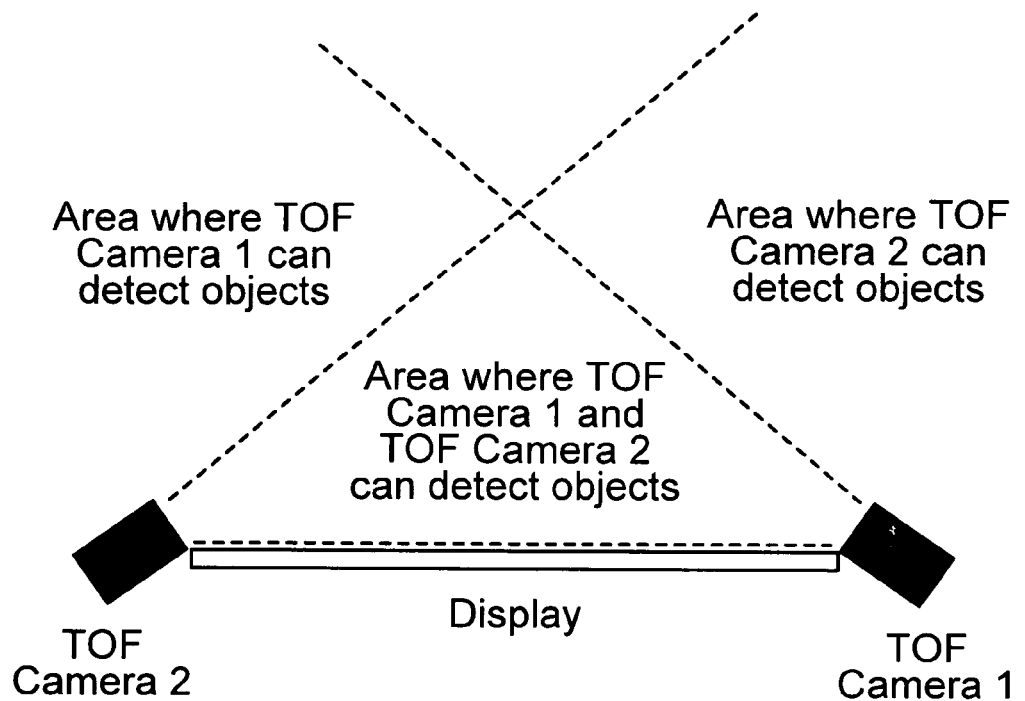
FIG. 1 illustrates a side view of an interactive display including multiple time-of-flight cameras, in accordance with an embodiment of the present invention.

Reference will now be made in detail to various embodiments of the invention, an electronic device for monitoring the presence of objects around a second electronic device, examples of which are illustrated in the accompanying drawings. While the invention will be described in conjunction with these embodiments, it is understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the invention, numerous specific details are set forth in order to provide a thorough understanding of the invention. However, it will be recognized by one of ordinary skill in the art that the invention may be practiced without these specific details. In other instances, well known methods, procedures, components, and circuits have not been described in detail as not to unnecessarily obscure aspects of the invention.

Some portions of the detailed descriptions, which follow, are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "projecting" or "detecting" or "changing" or "illuminating" or "correcting" or "eliminating" or the like, refer to the action and processes of an electronic system (e.g., an interactive video system), or similar electronic computing device, that manipulates and transforms data represented as physical (electronic) quantities within the electronic device's registers and memories into other data similarly represented as physical quantities within the electronic device memories or registers or other such information storage, transmission or display devices.

The interactive video display system of the described embodiments require the use of a video camera which produces a three-dimensional (3D) image of the objects it views. Time-of-flight cameras have this property. However, laser scanners, stereo cameras, and other technologies are also capable of producing 3D image data. Moreover, while the embodiments of the present invention are described as including at least one time-of-flight camera, it should be appreciated that the present invention may be implemented using any camera or combination of cameras that are operable to determine three-dimensional information of the imaged object, such as a laser scanners and stereo cameras.

Time-of-Flight Camera Interactive Display

Embodiments of the present invention may be implemented using time-of-flight cameras. A time-of-flight camera has a built-in capability to detect distance information for each pixel of its image. This distance information for each pixel may consist of the distance from the camera to the object seen at that pixel. Time-of-flight cameras obtain this distance data by timing how long it takes an invisible light pulse to travel from an illuminator next to the camera to the object being imaged and then back to the camera. The light pulses can be rapidly repeated, allowing the time-of-flight camera to have a frame rate similar to a video camera. Time of flight cameras typically have a range of 1–2 meters at 30 frames per second. However, the range can be significantly increased by lengthening the exposure time, which lowers the frame rate. Manufacturers of time-of-flight cameras include Canesta Inc of Sunnyvale, Calif., and 3DV systems of Israel.

The time-of-flight camera or cameras are positioned near a video display such that they can see objects on and in front of the display. In a preferred embodiment, the objects viewed by the camera or cameras consist of the hands, arms, and bodies of human users interacting with the display. The time-of-flight camera may work with any display (e.g., an LCD panel, a cathode-ray tube display, etc.) without modifications. Data from the time-of-flight camera or cameras may be processed in real time by a computer that uses the data to create interactive video effects on the display. The interactive video effects may be calibrated such that a user making a hand motion in front of a particular spot on the display will cause interactive video effects at that spot on the display. Thus, an "augmented reality" system is created, whereby users can use their hands and other parts of their bodies to manipulate virtual objects and cause digital visual effects on the display.

A single time-of-flight camera may be used. However, a single time-of-flight camera may not be able to detect objects that are blocked by objects closer to the camera. For example, if a user had one hand in front of the other relative to the camera, then the camera would not be able to see the other hand. Therefore, embodiments of the present invention may utilize multiple time-of-flight cameras, as shown in FIG. 1. The multiple cameras, with multiple perspectives, reduce the chance that an object will not be seen.

Figure 2:
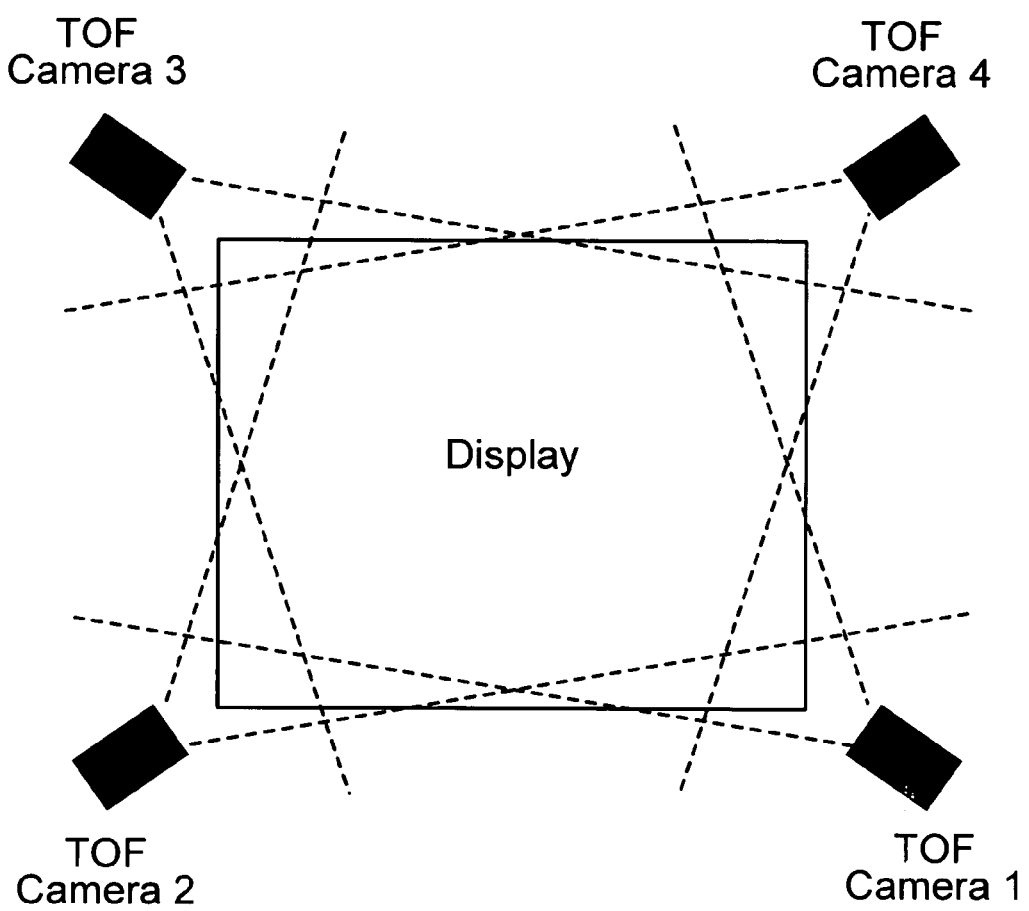
FIG. 2 illustrates a top view of an interactive display including multiple time-of-flight cameras, in accordance with an embodiment of the present invention.

With redundancy of cameras, there is no longer a need to worry about one camera not being able to detect all the objects because of one object occluding another object. For example, as shown in FIG. 2, four time-of-flight cameras may be placed at the corners of a display, ensuring that the entire area of the display is interactive.

In some embodiments of the system, the interactive space in front of the display has a coordinate system for specifying the location of users or objects in front of the display. At a conceptual level, the system should know the position the user or object is on the screen and how far it is away from the screen it is. Having user/object data in the aforementioned coordinate system is very useful as it allows the easy creation of interactive effects that are physically matched to positions on the display, as well as having interactive effects that depend on the distance from the user/object to the display.

In order to use this time-of-flight implementation for one or more cameras, a coordinate transform is performed on each pixel of each time-of-flight camera to put it in a common coordinate space with each other camera and the display. One such space is defined by: (x, y)—the position of the point projected perpendicularly onto the display surface, and (z)—the perpendicular distance of the point from the display. This coordinate space transformation can be determined by looking at the angle and position of each camera relative to the display. Alternatively, the transformation may be determined by a calibration process, in which an object of known size, shape and position is placed in front of the display. By having each of the cameras image the object, the appropriate transformation function can be determined from points viewed by each camera into points in the common coordinate space. If the camera coordinate transforms are done in real time, then a real-time picture of the area in front of the camera in 3D is achieved.

Figure 3:
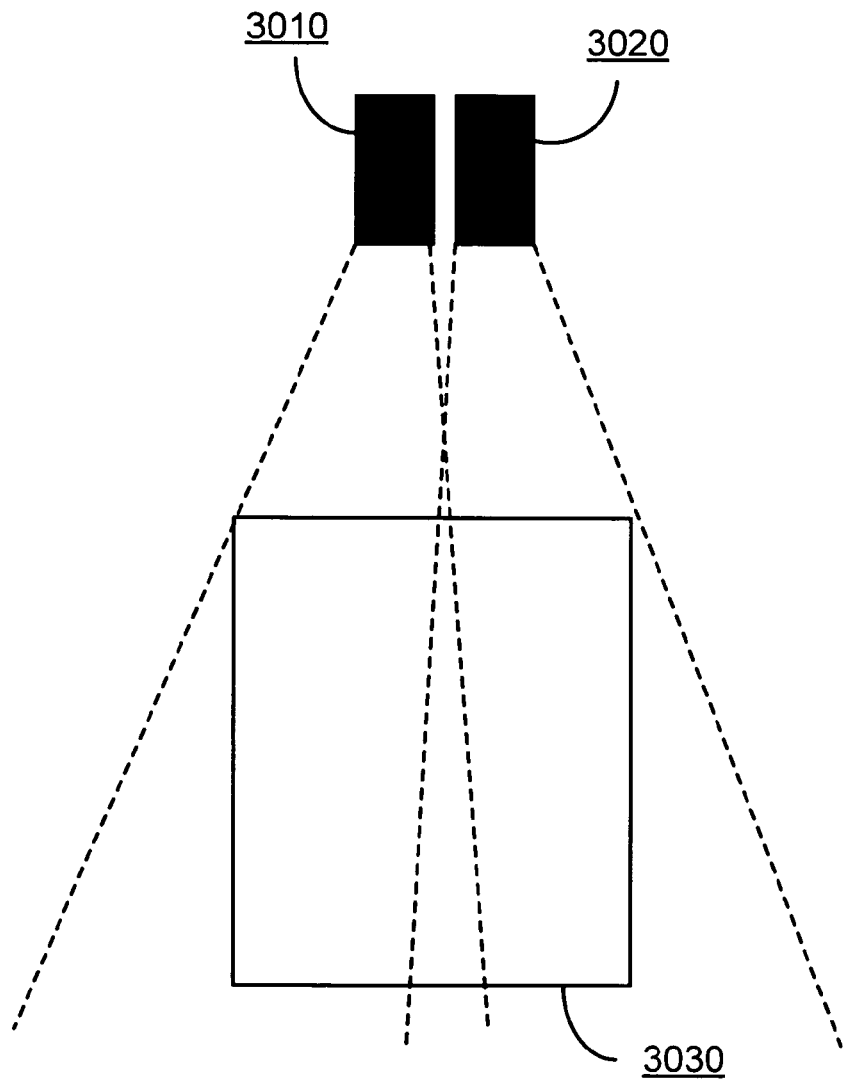
FIG. 3 illustrates a top view of an interactive display including multiple time-of-flight cameras, in accordance with an embodiment of the present invention.

Variations of the system of the present invention may be implemented using one or multiple time-of-flight cameras with a display. FIG. 3 illustrates a front view of an interactive display 3000 including multiple time-of-flight cameras, in accordance with an embodiment of the present invention. Interactive display 3000 includes time-of-flight cameras 3010 and 3020 that create an interactive area overlaying the surface of display 3030. It should be appreciated that multiple time-of-flight cameras may be placed at variations locations and positions around display 3030 to create the interactive area. The interactive area is bounded by the viewed region of the time-of-flight cameras, as shown by the dotted lines. For example, time-of-flight cameras may be placed in two corners of display 3030, four corners of display 3030 (as shown in FIG. 2), next to each other on one side of display 3030 so that the interactive areas of each camera are substantially parallel, or any other variation for creating an interactive area overlaying display 3030.

Figure 4:
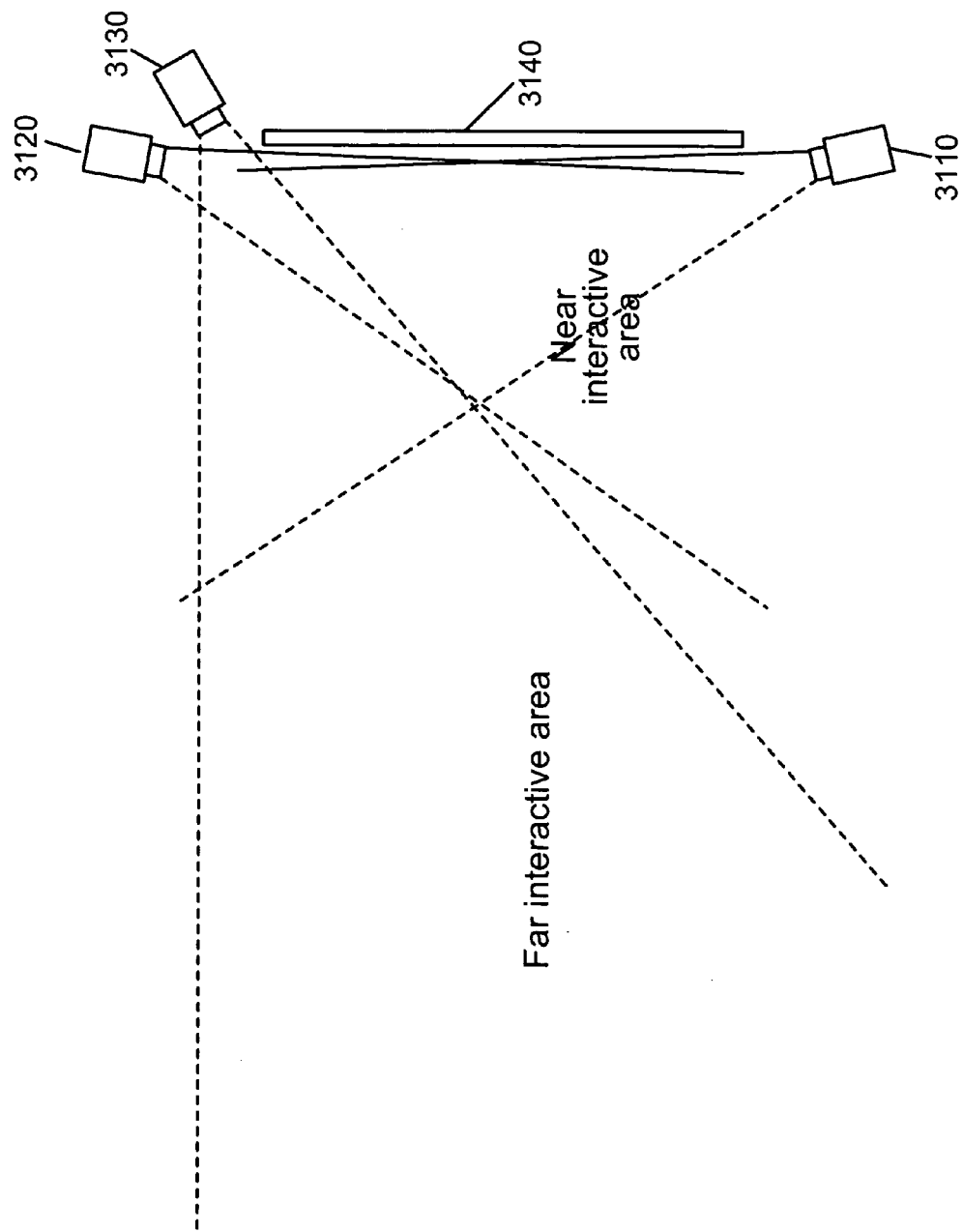
FIG. 4 illustrates a side view of an interactive display including multiple time-of-flight cameras for detecting interactions at different distances from the display, in accordance with an embodiment of the present invention.

FIG. 4 illustrates a side view of an interactive display 3100 including multiple time-of-flight cameras for detecting interactions at different distances from the display, in accordance with an embodiment of the present invention. Interactive display 3100 includes time-of-flight cameras 3110 and 3120 that create an interactive area overlaying and proximate the surface of display 3140. Time-of-flight camera 3130 creates an interactive area for a region farther from display 3140. Time-of-flight camera 3130 is operable to capture interactions farther from display 3140 than time-of-flight cameras 3110 and 3120. For instance, time-of-flight camera 3130 provides the ability to detect a person passing by interactive display 3100 at a certain distance and change the visual image shown on display 3140 to attract their attention. As the person approaches the display, they are picked up by time-of-flight cameras 3110 and 3120. In one embodiment, time-of-flight cameras 3110, 3120 and 3130 are the same type of time-of-flight camera, where time-of-flight camera 3130 operates at a lower frame rate and longer range than time-of-flight cameras 3110 and 3120.

Various other implementations of the present invention using time-of-flight cameras and a display are possible. In one embodiment, a time-of-flight camera or cameras are placed at a distance from the display to create the interactive region. For example, the display may be placed on a wall and the time-of-flight camera(s) may be placed on the opposite wall or on the ceiling, creating the interactive area between the time-of-flight camera(s) and the display. In another embodiment, the present invention may provide an interactive table, where the display is placed substantially horizontal and the time-of-flight camera(s) are above the table or to the side of the table. It should be appreciated that there are many different permutations of configurations of the present invention, and that the present invention is not limited to the described embodiments.

The distance information supplied by time-of-flight cameras can also be used to identify a user's hands. Identifying hands is important because hands are often used to provide specific interactions with the interactive display. In one embodiment, the hands are determined to be the points on each object viewed by the cameras that are closest to the display. In another embodiment, 3D shape recognition can be used to identify the hands. For example, simple cylinders or more complex skeletal models could be matched (using a variety of processes such as gradient descent) to users' hands, arms, and bodies. Other algorithms may also be used to identify the hands.

Figure 5A:
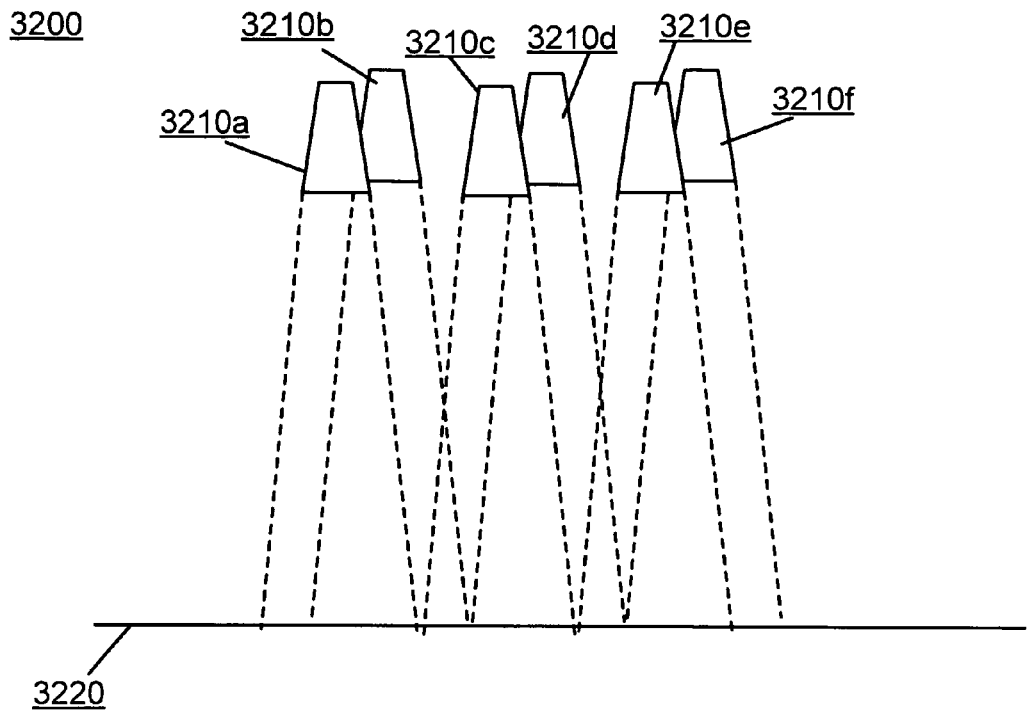
FIG. 5A illustrates a side view of an interactive floor display including multiple time-of-flight cameras, in accordance with an embodiment of the present invention
Figure 5B:
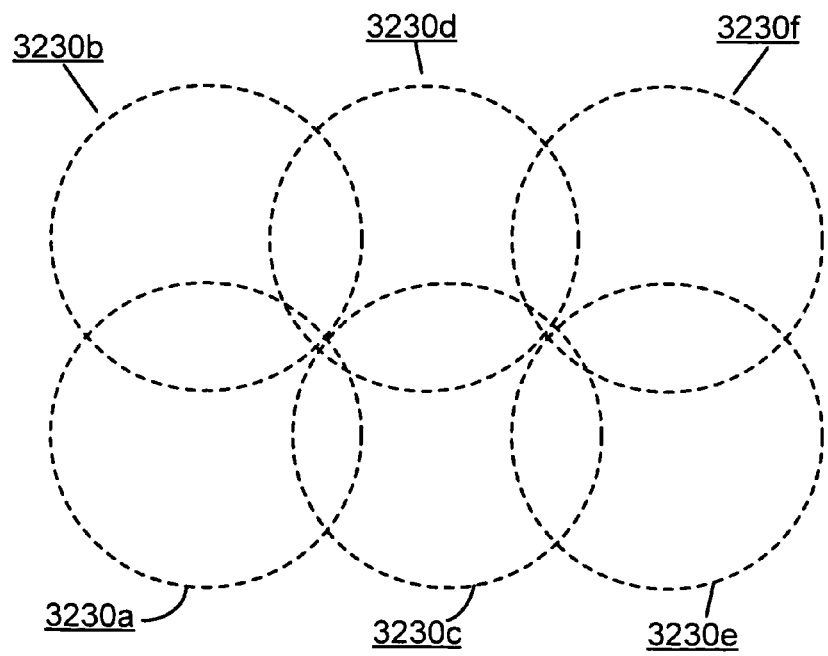
FIG. 5B illustrates a top view of the surface covered by the interactive floor display of FIG. 5A, in accordance with an embodiment of the present invention.

FIG. 5A illustrates a side view of an interactive floor display 3200 including multiple time-of-flight cameras, in accordance with an embodiment of the present invention. Interactive floor display 3200 includes six time-of-flight cameras 3210a–f placed above display surface 3220. Each time-of-flight camera is directed at a different portion of display surface 3220. In one embodiment, the smaller the area imaged by a time-of-flight camera to create an interactive area, the higher the frame rate possible by the time-of-flight camera. Thus, the more time-of-flight cameras covering a region of display surface 3220, the better the performance of interactive floor display 3200. FIG. 5B illustrates a top view of the surface covered by interactive floor display 3200 of FIG. 5A. Time-of-flight cameras 3210a–f each image a respective region 3230a–f for creating the interactive area.

Figure 6:
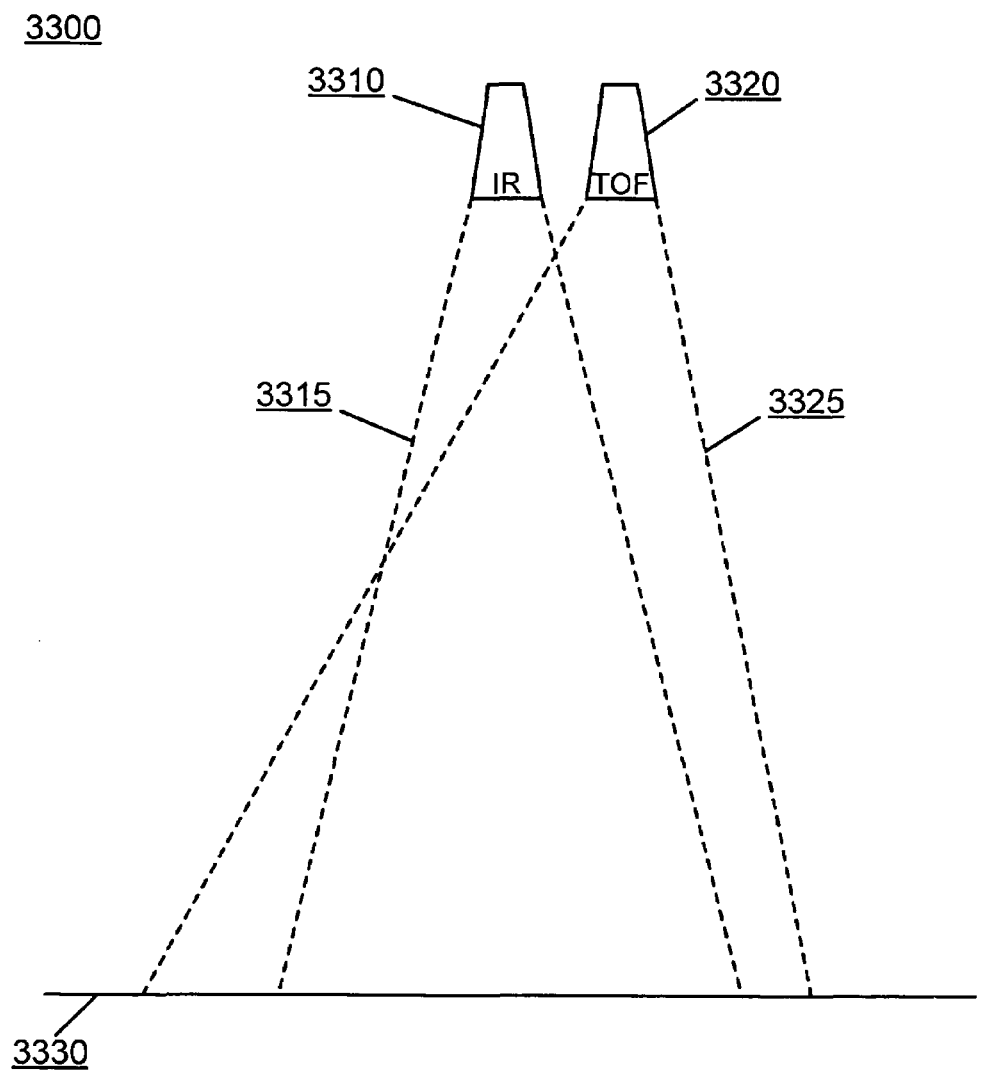
FIG. 6 illustrates a side view of an interactive display including an infrared camera and a time-of-flight camera, in accordance with an embodiment of the present invention.

FIG. 6 illustrates a side view of an interactive display 3300 including an infrared camera 3310 and a time-of-flight camera 3320, in accordance with an embodiment of the present invention. Infrared camera 3310 is operable to record images illuminated by infrared light of an infrared illuminator (not shown). Infrared camera 3310 and the infrared illuminator create interactive area 3315 above display surface 3330 (e.g., a floor). Time-of-flight camera 3320 is operable to create interactive area 3325 above display surface 3330. In one embodiment, interactive area 3325 covers a larger area than interactive area 3315. Infrared camera 3310 is operable to provide a succession of two-dimensional (2D) images of objects in interactive area 3315. In one embodiment, time-of-flight camera 3325 operates at a lower frame rate than infrared camera 3310 to provide three-dimensional image information of interactive area 3325 (including interactive area 3315).

The three-dimensional image information may be used to label the two-dimensional image to provide high quality three-dimensional image information. In one embodiment, the three-dimensional image information of time-of-flight camera 3325 is superimposed on the two-dimensional image. Thus, the high resolution of the two-dimensional image is preserved as the 3D information is incorporated. In some embodiments, the 3D camera will have a lower frame rate than the 2D camera. However, using techniques such as feature tracking, 3D information can be estimated for two-dimensional images taken without a corresponding three-dimensional image. Since a feature tracking algorithm operating on the stream of 2D images can track the movement of several patches of an object, the 3D information from the most recent 3D camera image can be tracked to its current positions in the two-dimensional image, thus providing estimated 3D information even at times when no 3D image is available.

The three-dimensional image information can also be used to provide for person tracking. For example, the height of the highest point of an object can be used to identify the object as a person. In one embodiment, where the camera is on the ceiling and images a region on the floor, the point closest to the camera for each person can be identified. The height, size, and 3D shape of each object viewed by the cameras can be used to identify whether it is a person. This can be useful in determining how many people are interacting with interactive display 3300. Also, height information can be used to distinguish between adults and children, which may be useful information for marketing purposes. Other information can also be acquired, such as the orientation of people (e.g., standing, sitting, lying down). In one embodiment, since interactive area 3325 is bigger than interactive area 3315, people can be tracked that are not interacting with interactive area 3315. This information can be used to identify what portion of people passing interactive display 3300 actually end up interacting with interactive display 3300. It should be appreciate that person tracking and feature tracking may be performed without the use of an infrared camera, because the three-dimensional information provided by a time-of-flight camera is sufficient. However, the infrared camera is useful for getting higher-quality 2D outline and shape information, which may be useful in creating the interactive effects.

Figure 7:
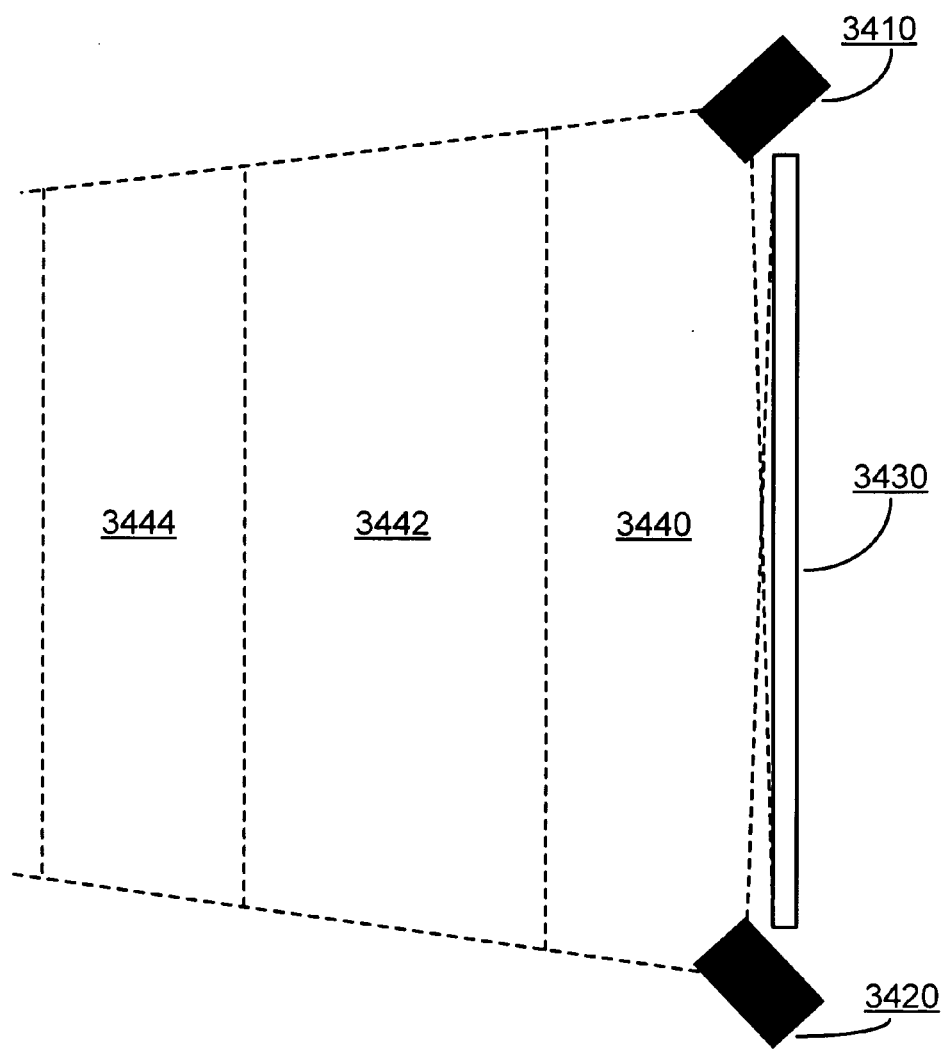
FIG. 7 illustrates an interactive display system including different volumetric interactive regions, in accordance with an embodiment of the present invention.

The 3D nature of the information from time-of-flight cameras provides an interactive display system of the present invention the ability to ignore or change the processing of data from objects that fall inside different volumetric regions in front of the display. FIG. 7 illustrates an interactive display system 3400 including different volumetric interactive regions, in accordance with an embodiment of the present invention. While interactive display system 3400 is shown as a wall display, it should be appreciated that other types of displays, such as floor displays and table displays, can be implemented. Interactive display 3400 includes time-of-flight cameras 3410 and 3420 that create an interactive area including different interactive areas in front of the surface of display 3430. Since time-of-flight cameras include distance information for viewed objects, different interactive areas that include specific volumetric regions at particular distances from display 3430 may be defined.

Interactive display 3400 includes interactive regions that include specific volumetric regions. For instance, region 3440, also referred to herein as the touch region, is proximate to display 3430. In one embodiment, the touch region extends up to six inches out from display 3430. Region 3442, also referred to herein as the interactive region, extends from the end of the touch region. In one embodiment, the interactive region may be dynamic. For instance, if no people are interacting with interactive display 3400, region 3442 may extend several feet or to the end of a room to attempt to cause people to interact, thereby attracting their attention. Once a person engages interactive display 3400, the back of region 3442 may move in so as to ensure that other more distant people passing by do not affect the display. In one embodiment, the interactive region ends a particular distance (e.g., one foot) behind the nearest person in the interactive region. It should be appreciated that interactive display 3400 may include any number of volumetric interactive regions (e.g., region 3444), and is not limited to the described embodiments.

The touch zone also allows for a user to perform certain types of gestures. For example, display 3430 may display an object that a user can move through hand gestures. This movement of objects can be thought of as being analogous to the "drag and drop" operation commonly performed with a computer mouse, except in this case it is done using a hand gesture. In one embodiment, the user selects the object by moving their hand toward the object and crossing through the threshold separating the touch zone from the interactive zone. Staying in the touch zone, the user moves their hand to another location, and the object follows their hand's movement. The user can then release the object by pulling their hand back, moving it out of the touch zone. In another embodiment, the object can be selected by moving into and out of the touch zone such that the object may be moved while the hand is in the interactive zone. Then, the user can release the object by moving their hand back into and out of the touch zone. In another embodiment, the object can be selected by the user making a grabbing motion (closing their hand). The object could then be moved by the user moving their hand, and finally released by the user by opening their hand.

The touch zone can also be used for pressing virtual buttons or selecting objects on the display. In one embodiment, a user can press a button by moving their hand over the button's image on the display and then moving their hand towards the display until their hand crosses the threshold from the interactive zone to the touch zone. When their hand crosses this threshold, the button is pushed.

Information from the coordinate-transformed 3D data about objects or users in front of the display, such as their shape or outline, can serve as input to visual effects on the display. For example, the outline (from the display's point of view) of users in front of the display can be shown on the display to give users a sense of where they are as they are using the system.

In one embodiment, display 3430 changes in response to an object being selected and/or released. In one embodiment, display 3430 includes one or more icons that are associated with the hands of a user and are located at the position(s) on the screen corresponding to the user's hand(s). It should be appreciated that there can be multiple icons active on display 3430 at any time. The icon can transform (e.g., change shape, color, or size) when a user moves from the interactive zone to the touch zone, signifying a selection or release of an object.

Uses

The interactive video display system can be used in many different applications. The system's capability to have touchscreen-like behavior for multiple users as well as full or partial body outline interaction increases its appeal for information interfaces which require more precise selection and manipulation of buttons and objects.

Uses of these interactive display systems include, but are not limited to, interactive video games in which users move their bodies to play the game, interactive menu, catalog, and browsing systems that let users browse through pages of informational content using gestures, systems that allow users to "try on" clothing using an image of themselves, pure entertainment applications in which images or outlines of users serve as input to a video effects system, interactive characters that interact with the motions of users in front of the screen, and virtual playlands and storybooks that users interact with by moving their bodies.

Other uses of the present invention include, but are not limited to: allowing users to customize or view available options for customizing the product on display, allowing the product on display to be ordered at the display, using either the display interface, a keyboard, a credit card swiper, or a combination of the three, comparing the features of multiple products on the display, showing combinations or compatibilities between multiple products on the display, and placing a product in different virtual settings on the screen to demonstrate the features (e.g., water, forest, asphalt, etc.)

Peripherals

These interactive display systems can incorporate additional inputs and outputs, including, but not limited to, microphones, touchscreens, keyboards, mice, radio frequency identification (RFID) tags, pressure pads, cellular telephone signals, personal digital assistants (PDAs), and speakers.

These interactive display systems can be tiled together to create a single larger screen or interactive area. Tiled or physically separate screens can also be networked together, allowing actions on one screen to affect the image on another screen.

In an exemplary implementation, the present invention is implemented using a combination of hardware and software in the form of control logic, in either an integrated or a modular manner. Based on the disclosure and teachings provided herein, a person of ordinary skill in the art will know of other ways and/or methods to implement the present invention.

In one exemplary aspect, the present invention as described above provides a system that allows a camera to view an area in front of a display. In a related invention, a system is provided to create a reactive space in front of the display. The present invention can be used to capture information from the reactive space.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

Various embodiments of the invention, an interactive video display system, are thus described. While the present invention has been described in particular embodiments, it should be appreciated that the invention should not be construed as limited by such embodiments, but rather construed according to the below claims.

What is claimed is:

1. An interactive video display system comprising:
   a display screen for displaying a visual image for presentation to a user;
   a first camera for detecting an object in an interactive area located in front of said display screen, said first camera operable to capture three-dimensional information about said object;
   a second camera for creating a second interactive area; and
   a computer system for directing said display screen to change said visual image in response to said object;
   wherein said first camera provides said computer system with three-dimensional information at a first frame rate and said second camera provides said computer system with two-dimensional information at a second frame rate, wherein said first frame rate is slower than said second frame rate, such that said computer system is operable to generate high quality three-dimensional information based on said three-dimensional information and said two-dimensional information.

2. The interactive video display system as recited in claim 1 wherein said first camera is a time-of-flight camera.

3. The interactive video display system as recited in claim 1 wherein said display screen is a cathode ray tube.

4. The interactive video display system as recited in claim 1 wherein said display screen is a flat-panel display screen.

5. The interactive video display system as recited in claim 4 wherein said flat-panel display screen is a liquid crystal display screen.

6. The interactive video display system as recited in claim 1 wherein said display screen is a plasma screen.

7. The interactive video display system as recited in claim 1 further comprising a projector for projecting said visual image and wherein said display screen is a screen for displaying said visual image.

8. The interactive video display system as recited in claim 1 further comprising a third camera for detecting said object, said third camera operable to capture three-dimensional information about said object.

9. The interactive video display system as recited in claim 8 wherein said third camera is a time-of-flight camera.

10. The interactive video display system as recited in claim 8 wherein said first camera and said third camera operate in conjunction to create said interactive area.

11. The interactive video display system as recited in claim 8 wherein said first camera is operable to create said interactive area proximate said display screen, and wherein said third camera is operable to create a third interactive area farther from said display screen than said interactive area.

12. The interactive video display system as recited in claim 1 wherein said computer system can identify a portion of people near said interactive video display system actively interact with said interactive video display system by determining people in said second interactive area that do not enter said interactive area.

13. The interactive video display system as recited in claim 1 wherein said distance information is used for person tracking.

14. The interactive video display system as recited in claim 1 wherein said interactive area comprises a plurality of interactive regions including volumetric regions at particular distances from said display screen.

15. The interactive video display system as recited in claim 14 wherein a first volumetric region extends from said display screen to a particular distance from said display screen, and a second volumetric region extends from said particular distance away from said display screen.

16. The interactive video display system as recited in claim 15 wherein said second volumetric region extends to a second particular distance away from said display screen.

17. The interactive video display system as recited in claim 16 wherein said second particular distance is dynamic.

18. The interactive video display system as recited in claim 14 wherein a user may interact with said visual image by moving into and out of said first volumetric region.

19. The interactive video display system as recited in claim 1 wherein said object is a user.

20. The interactive video display system as recited in claim 1 wherein said first camera is separate from said display screen, such that said interactive area is between said first camera and said display screen.

21. The interactive video display system as recited in claim 20 wherein said second camera is separate from said display screen.

22. The interactive video display system as recited in claim 21 wherein said first camera and said second camera operate in conjunction to create said interactive area.

23. The interactive video display system as recited in claim 21 wherein said first camera is operable to create said interactive area proximate said display screen, and wherein said second camera is operable to create said second interactive area farther from said display screen than said interactive area.

24. The interactive video display system as recited in claim 1 wherein said second camera is an infrared camera for creating said second interactive area.

25. The interactive video display system as recited in claim 1 wherein said three-dimensional information is for providing interactions of said object physically matched to a location on said display screen.

26. A method for presenting an interactive visual image using an interactive video display system, said method comprising:
    displaying a visual image on a display screen, wherein said visual image is for presentation to a user on a front side of said display screen;
    detecting interaction of an object with said visual image using a three-dimensional camera, said three-dimensional camera operable to capture three-dimensional information about said object at a first frame rate;
    detecting interaction of said object with said visual image using an infrared camera, said infrared camera operable to capture two-dimensional information about said object at a second frame rate, wherein said first frame rate is slower than said second frame rate;
    generating high quality three-dimensional information based on said three-dimensional information and said two-dimensional information; and
    changing said visual image in response to said interaction.

27. The method as recited in claim 26 wherein said three-dimensional camera is a time-of-flight camera.

28. An interactive video display system comprising:
    a display screen for displaying a visual image for presentation to a user;
    a time-of-flight camera for detecting an object in an interactive area located in front of said display screen, said time-of-flight camera operable to capture three-dimensional information about said object;
    an infrared camera for creating a second interactive area; and
    a computer system for directing said display screen to change said visual image in response to said object, wherein said three-dimensional information is for providing interactions of said object physically matched to a location on said display screen;
    wherein said time-of-flight camera provides said computer system with three-dimensional information at a first frame rate and said infrared camera provides said computer system with two-dimensional information at a second frame rate, wherein said first frame rate is slower than said second frame rate. such that said computer system is operable to generate high quality three-dimensional information based on said three-dimensional information and said two-dimensional information.

* * * * *